Nov. 19, 1963 V. S. THOMANDER 3,111,623
FILAR SUSPENDED INSTRUMENT MOVEMENT
Filed Sept. 18, 1958 8 Sheets-Sheet 1

WITNESSES

INVENTOR
Veron S. Thomander
BY
ATTORNEY

Nov. 19, 1963    V. S. THOMANDER    3,111,623
FILAR SUSPENDED INSTRUMENT MOVEMENT
Filed Sept. 18, 1958    8 Sheets-Sheet 4

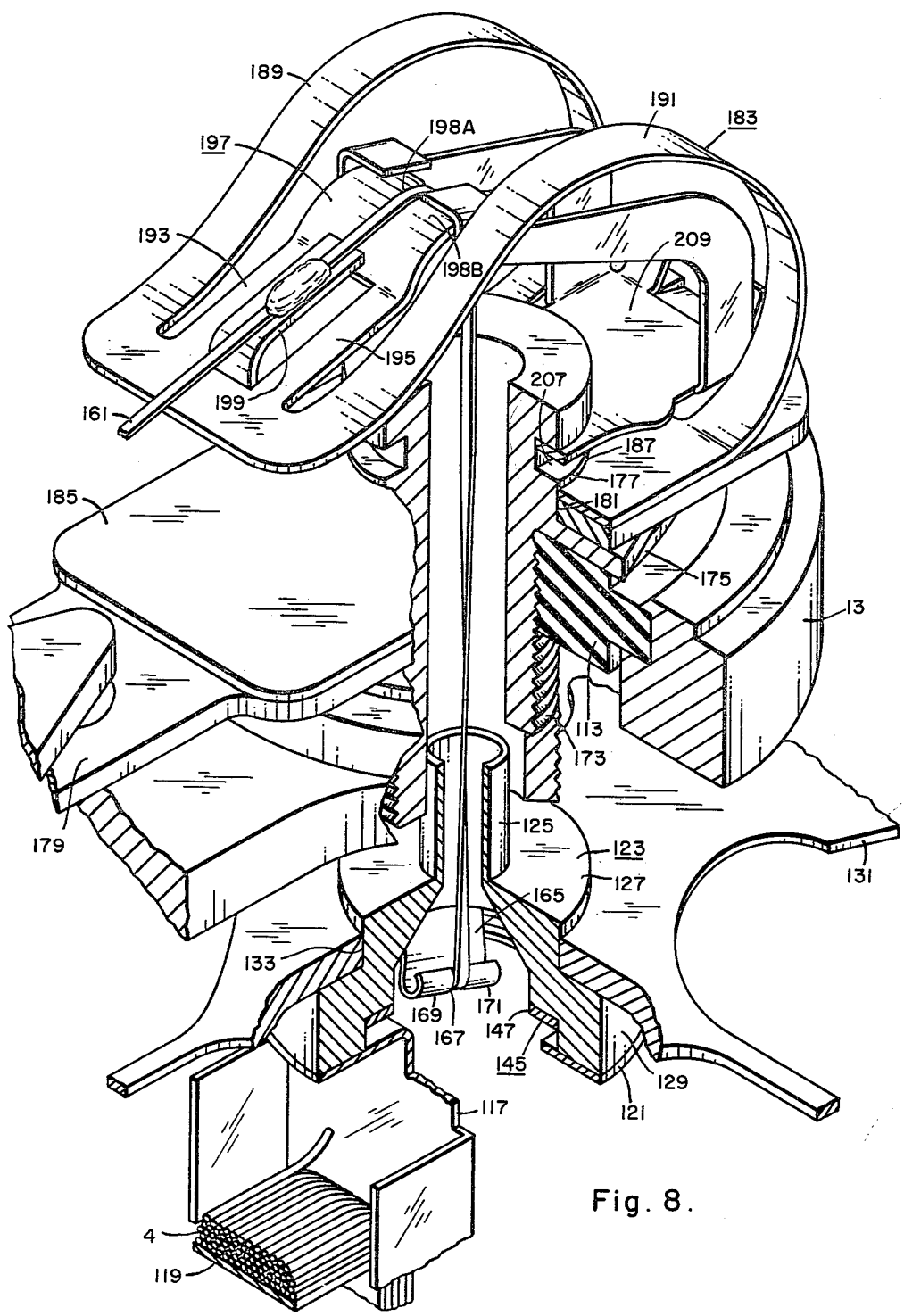

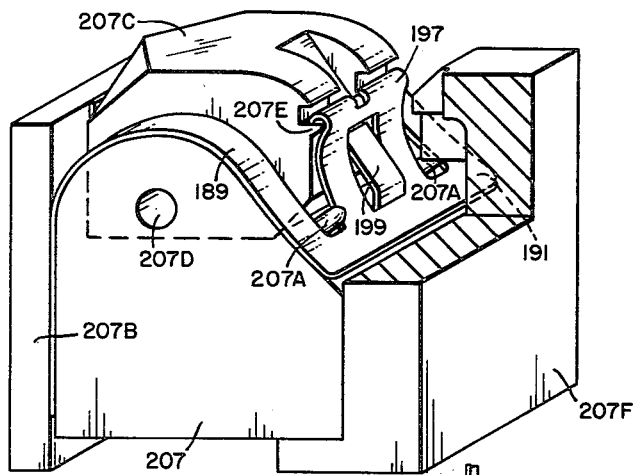
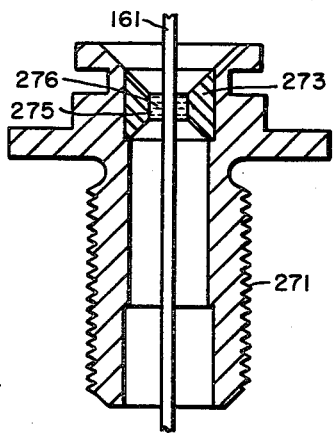
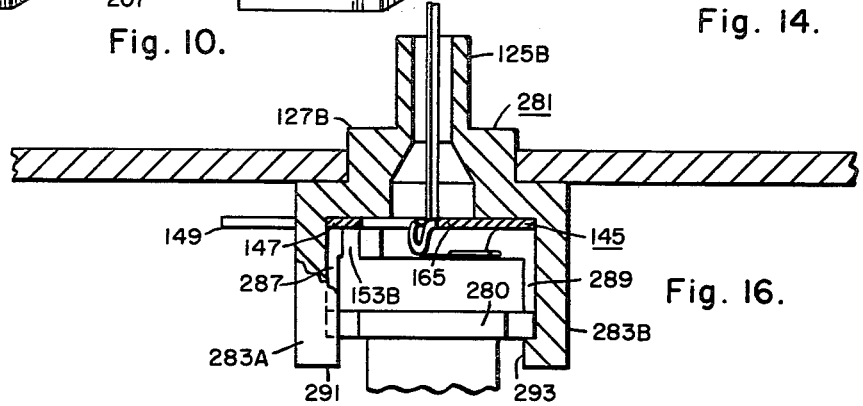
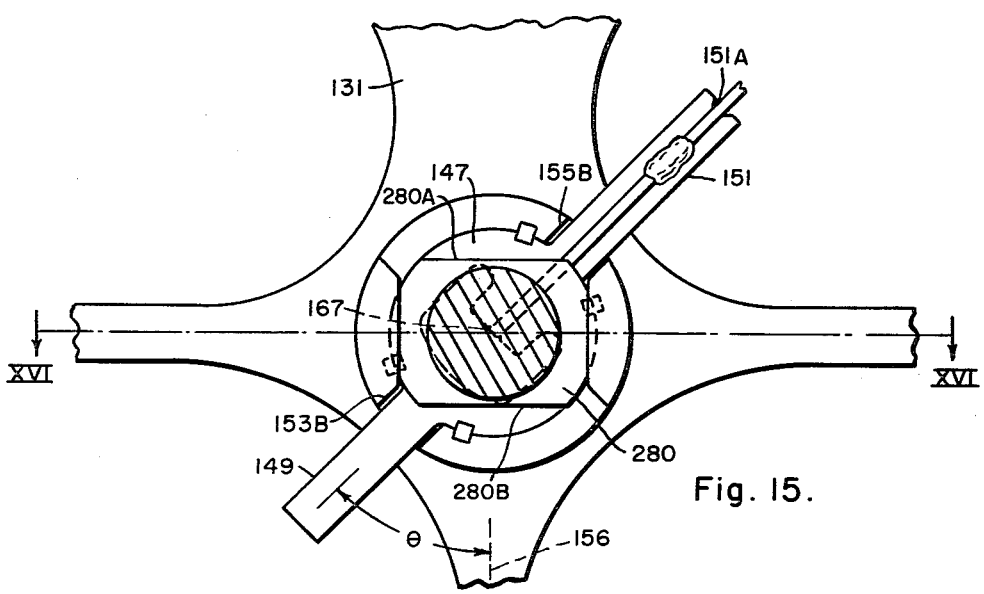

United States Patent Office 3,111,623
Patented Nov. 19, 1963

3,111,623
FILAR SUSPENDED INSTRUMENT
MOVEMENT
Veron S. Thomander, Maplewood, N.J., assignor to Westinghouse Electric Corporation, East Pittsburgh, Pa., a corporation of Pennsylvania
Filed Sept. 18, 1958, Ser. No. 761,899
28 Claims. (Cl. 324—154)

This invention relates to rotatable devices, and it has particular relation to measuring instruments having rotor units mounted for rotation with respect to stator units.

Although aspects of the invention are applicable to various rotor units mounted for rotation with respect to stator units, the invention is particularly suitable for electrical measuring instruments. For exemplary purposes, the invention will be described as applied to a permanent-magnet moving-coil measuring instrument.

The mounting of a rotor unit for rotation with respect to a stator unit has presented a serious problem, particularly as applied to sensitive measuring instruments. The solution most commonly encountered employs fragile jewels and delicate pivots associated to provide bearings. If electrical energy is to be supplied to or from the rotor unit, it has been the practice with such bearings to employ flexible electroconductive springs for the purpose of conducting electric current to or from the rotor unit.

Even though shock mounts and stops are employed the jewels and pivots are susceptible to damage by vibration and shock. Not only do such bearings present substantial friction, which increases with use but they are subject to random errors due to axial and radial play in the bearings. It should be noted that the errors resulting from such play cannot be predicted or compensated for. The bearings may be oiled to minimize wear but the maintenance of adequate lubrication is a separate problem.

The prior art also has mounted a rotor unit for rotation relative to a stator unit by means of filamentary elements of substantial length. These mountings permitted limited rotation of the rotor unit through an angle not exceeding 90°, and the associated instruments were difficult to adjust. It should be noted that the longer suspensions are not suited for horizontal mounting of rotor units.

In accordance with the invention short filamentary elements are employed for mounting a rotor unit for rotation about an axis with respect to a stator unit. Despite the shortness of the filamentary elements, the invention permits large rotations of the rotor unit through angles well in excess of 120° and even in excess of 250°, and the instrument may be mounted in any position.

The filamentary elements are stressed or maintained in tension by means of compact springs. Such a spring permits a substantial movement of the associated filamentary element with only small changes in the force exerted by the spring. Furthermore, such movement does not result in appreciable deviation of the rotor unit radially relative to its axis of rotation.

Each of the filamentary elements has a length disposed along the axis of rotation of the associated rotor unit and each end of a filamentary element is accurately anchored or guided with respect to the axis of rotation of the rotor unit. As previously pointed out, the filamentary elements are extremely short and are of improved construction. Thus, the filamentary element may have a length in inches along the axis of rotation which does not exceed the number of degrees of rotation which is to be permitted divided by 300. In a preferred embodiment of the invention, such length is less than the degrees of rotation permitted for the rotor unit divided by 650. Although the filamentary elements may have a round cross section, desirably they have a non-circular cross section, the preferred cross section being of rectangular configuration. The lengths of the filamentary elements along the axis of rotation of the rotor unit may be in the same plane. Preferably, however, they are displaced from each other angularly about the axis by a substantial angle, preferably 90°. To assure accurate positioning of the parts, preferably the parts are positioned by surfaces of revolution.

The filamentary elements provide a mounting for the rotor unit which is highly resistant to vibration and shock. If additional damping is required, it may be applied in a form of a damping medium such as a damping grease or damping oil which is disposed in engagement with each of the filamentary elements. The damping material does not interfere with correct twisting of the filamentary element about the axis of rotation of the rotor unit, but is highly effective in damping shock movement of the filamentary element in a direction radial relative to the axis. Such damping material facilitates proper reading of measuring instruments in environments subject to severe vibration.

When the invention is applied to a permanent-magnet moving-coil measuring instrument, it permits the construction of such an instrument which may be used in a universal manner to measure voltage or in conjunction with a shunt to measure current. To this end the moving coil preferably is associated with a severable damping ring which may be severed if the damping provided by such ring is not required. The damping ring preferably is constructed of a continuous ring of electroconductive ribbon or strip. The magnitude of the damping may be selected by selection of the width of the strip. Preferably, the rotor unit or the universal instrument is of light weight. To this end the parts of the rotor unit including the winding of the coil are constructed of a lightweight material such as aluminum. Such a rotor unit when mounted by the filamentary elements may be designed with adequate sensitivity and sufficiently low resistance to serve as a universal instrument. Thus a standard instrument is available which can be converted for use over any desired voltage or current range.

The invention further contemplates a field structure which provides an adjustable magnetic field. This field structure may be utilized to provide a magnetic field for the air gap in which the moving coil of a permanent-magnet moving-coil instrument operates. Preferably, the field structure is adjustable for the purpose of adjusting both the magnitude of the magnetic field and the field distribution. To this end different magnetic paths are provided for supplying magnetic flux to separate parts of the air gap. The magnetic reluctance of each of the paths is separately adjustable.

An additional provision is made for controlling the magnetic-field distribution. This control is exercised by varying the effective axial length of the air gap. In a preferred embodiment of the invention the air gap is defined in part by a pole piece having a small dimension in a direction radial relative to the axis of rotation of the rotor unit. The dimension of the pole piece in a direction parallel to the axis varies for the purpose of controlling the magnetic field distribution.

It is therefore an object of the invention to provide an improved mounting for mounting a rotor unit for rotation relative to a stator unit about an axis, wherein short filamentary elements are disposed along the axis for mounting the rotor unit.

It is also an object of the invention to provide a mounting as set forth in the preceding paragraph, wherein the filamentary elements are maintained in tension by a compact spring having a long spring motion with a small change in force exerted by the spring.

It is another object of the invention to provide a spring as set forth in the preceding paragraph, wherein deflection of the spring has negligible effect on the position of the rotor unit in a direction radial to its axis of rotation.

It is a further object of the invention to provide improved filamentary elements for mounting a rotor unit for rotation with respect to a stator unit.

It is a still further object of the invention to provide an instrument having a rotor unit mounted for rotation about an axis relative to a stator unit by filamentary elements, wherein parts of the instrument are positioned accurately by surfaces of revolution.

It is an additional object of the invention to provide improved damping for a rotor unit which is mounted for rotation with respect to a stator unit.

It is still another object of the invention to provide a universal permanent-magnet moving-coil instrument.

It is a further object of the invention to provide a severable damping ring for a moving-coil instrument.

It is also an object of the invention to provide an improved field structure for controlling the magnitude and distribution of a magnetic field.

It is another object of the invention to provide an improved pole piece for an instrument having a magnetic structure establishing an air gap.

It is also an object of the invention to provide an instrument having a magnetic structure providing an air gap arcuate about an axis, wherein the air gap has a dimension parallel to the axis which varies angularly about the axis.

It is another object of the invention to provide an improved method for fabricating springs for suspension instruments.

It is also an object of the invention to provide an improved method for fabricating filamentary elements employed in suspension instruments.

Other objects of the invention will be apparent from the following description taken in conjunction with the accompanying drawings, wherein:

FIG. 8 is an enlarged perspective view showing the upper suspension of the instrument of FIG. 1;

FIG. 10 is a view in perspective of the spring of FIG. 9 mounted in a fixture for heat treatment;

FIG. 14 is a view in sectional elevation with parts broken away showing a damping construction which may be employed in a suspension instrument;

FIG. 15 is a detailed view in bottom plan with parts broken away showing a modified tower construction, and FIG. 16 is a view in section taken along the line XVI—XVI of FIG. 15.

*General Description*

Figure 1:
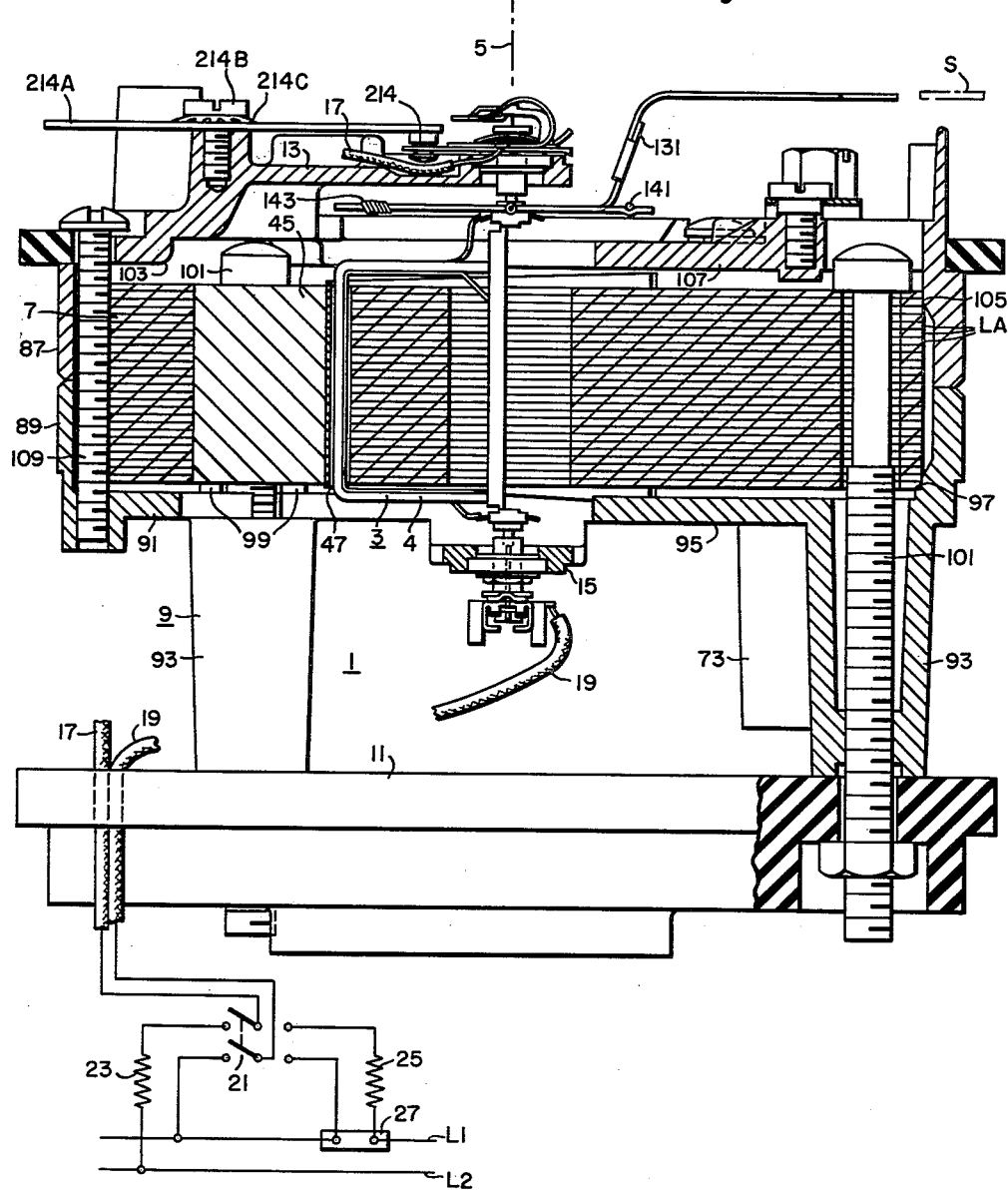
FIGURE 1 is a view in sectional elevation with a rotor unit in center-scale position and with parts schematically shown of an instrument embodying the invention and its connections.

Referring to the drawings, FIG. 1 shows a permanent-magnet moving-coil instrument which includes a stator unit 1 and a rotor unit 3 mounted for rotation relative to the stator unit about an axis represented by a broken line 5. The stator unit includes a magnetic structure 7 which provides an air gap 47 arcuate about the axis 5. The rotor unit 3 includes a coil 4 having a coil side disposed in the air gap for rotation about the axis. The magnetic structure includes means (described below) for producing a magnetic field in the air gap.

The magnetic structure 7 is mounted in a frame unit 9 which is secured to a suitable base represented by a panel 11 of insulating material. The frame unit 9 also includes bridges 13 and 15 which mount the rotor unit 3 for rotation about the axis 5.

The coil provided in the rotor unit 3 is connected through conductors 17 and 19 to the blades of a double throw switch 21. When the switch blades are operated to the left as viewed in FIG. 1, the coil is connected across the conductors L1 and L2 of a direct-current circuit through a resistor 23 for the purpose of measuring the voltage across the two conductors. When the blades of the switch 21 are operated to the right as viewed in FIG. 1, the coil is connected through a swamping resistor 25 across the output terminals of a shunt 27. The shunt has its input terminals connected in the conductor L1 for the purpose of energizing the coil in accordance with current flowing in the conductor L1. Although the switch 21 is employed to illustrate connections of the coil to measure voltage or current, the damping arrangements preferably differ for the two applications. This, together with the various components of FIG. 1, will be described in greater detail below.

*Magnetic Structure*

Figure 2:
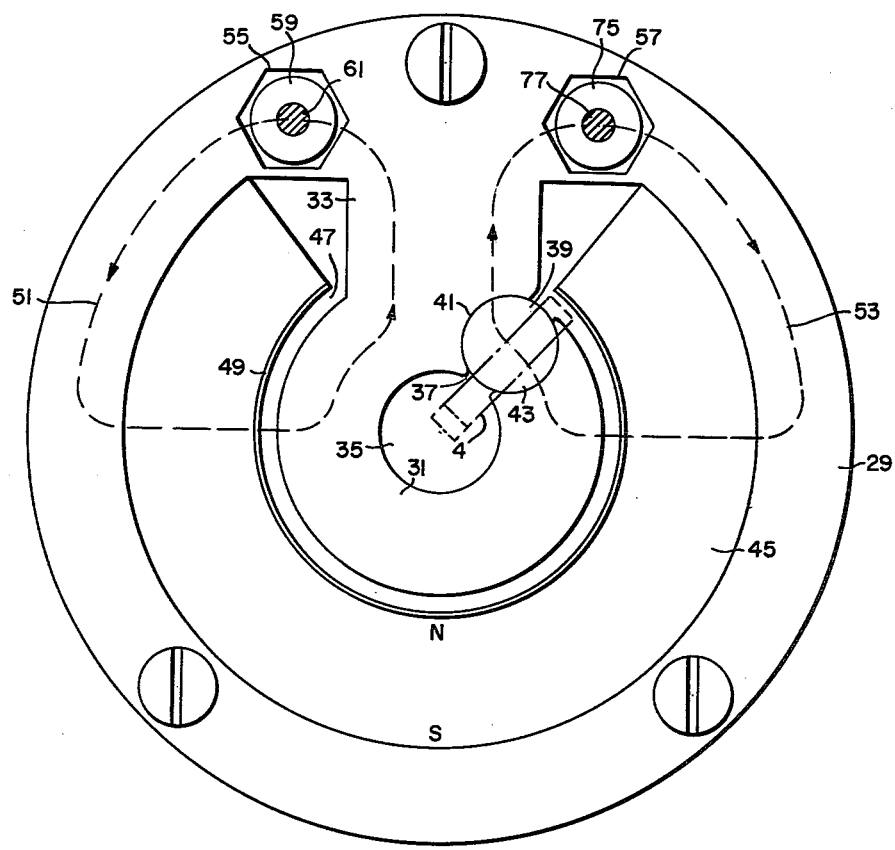
FIG. 2 is a view in top plan of the magnetic structure employed in the instrument of FIG. 1.

By reference to FIG. 2 it will be noted that the magnetic structure 7 includes a circular ring 29 which is connected to a cylindrical core 31 through a neck 33. The cylindrical core 31 has an opening 35 therethrough parallel to the axis for receiving one side of the coil 4 which is shown in broken lines in FIG. 2. To permit movement of the coil 4 between the position illustrated and a position external to the magnetic structure, the cylindrical core 31 is provided with a passage 37 of sufficient size to permit movement therethrough of the coil 4. Although this passage 37 may be positioned symmetrically with respect to the magnetic structure, it is preferably positioned adjacent the neck 33 as shown in FIG. 2. The passage consequently gives the cylindrical core a hook-shaped or C-shaped configuration.

Preferably, the passage 37 is substantially closed by a plug 39. As illustrated, the passage 39 is located between two arcuate surfaces 41 and 43. The surfaces 41 and 43 define a substantially cylindrical opening having an axis substantially parallel to the axis of the cylindrical core 31. The passage then is closed by a cylindrical plug 39 which may have a light press fit with adjacent parts of the cylindrical core 31.

The ring 29, the cylindrical core 31, the neck 33 and the plug 39 are constructed of soft magnetic material. The parts may be of powdered construction, solid construction or laminated construction. However, in a preferred embodiment of the invention the ring 29, the cylindrical core 31 and the neck 33 are formed of unitary laminations LA of suitable soft magnetic material, such as ferromagnetic material having high magnetic permeability and negligible coercive force. Each of the laminations has an outline similar to that shown in FIG. 2. The laminated construction of this portion of the magnetic structure is clearly shown in FIG. 1. The laminations may be secured to each other in any suitable manner as by rivets, bolts or cement. Each of the laminations may be punched accurately into a shape similar to that shown in FIG. 2 for the ring 29, the cylindrical core 31 and the neck 33. The plug 41 may be constructed of solid soft magnetic steel. The plug construction may be similar to that described in the copending patent application of L. J. Lunas, Serial No. 664,759, filed June 10, 1957, now Patent No. 2,959,736, which issued November 8, 1960.

It will be noted that the cylindrical core 31 and the ring 29 are concentrically located to provide an arcuate space therebetween. Magnetic flux may be directed across this space in any suitable manner. For example, the neck 33 of the magnetic structure could be constructed of permanent magnet material. However, in a preferred embodiment of the invention a C-shaped permanent magnet 45 is positioned in this space. It will be noted that this permanent magnet has an outer cylindrical surface which is in engagement with the inner surface of the ring 29. If desired, these two parts may be cemented or otherwise secured to each other. The permanent magnet has its inner cylindrical face spaced from the cylindrical core 31 to define the arcuate air gap 47 therebetween. One coil side of the coil 4 is positioned in this air gap for rotation about the axis of rotation of the coil. The permanent magnet 45 is magnetized in radial directions to provide inner and outer pole faces. For example, the inner pole face is indicated as a north pole face N, whereas the outer pole face is illustrated as a south pole face S.

Although the pole face of the permanent magnet itself may form one face of the air gap 47, preferably a pole piece 49 of soft magnetic material is applied to the inner face of the permanent magnet. This pole piece has a small dimension measured in a radial direction relative to the axis of the magnetic structure. For example, this dimension may be less than 1/16 of an inch. In a preferred embodiment of the invention the pole piece actually is punched from flat sheet steel .015 inch thick with a configuration shown in FIG. 3. The pole piece then is rolled into the desired arcuate shape and cemented or otherwise secured to the permanent magnet 45.

Figure 3:
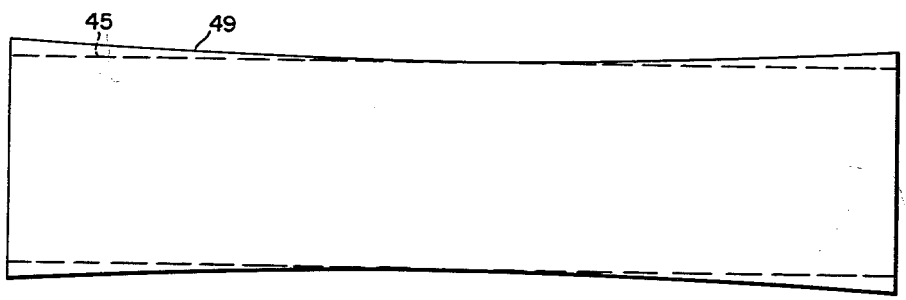
FIG. 3 is a view in developed form of a pole piece employed in the instrument of FIG. 1.

If the pole piece 49 had a uniform dimension in a direction parallel to the axis of the magnetic structure, the magnetic flux density in the air gap adjacent the neck 33 would be less than the flux density in the central part of the air gap. This variation in flux density is due in part to magnetic flux leakage from the permanent magnet adjacent the neck 33. By varying the dimension of the pole piece 49 in a direction parallel to the axis of the magnetic structure at different points about the axis, the effective magnetic field in the air gap may be shaped to provide a desired field distribution. The axial dimension of the permanent magnet 45 is shown in FIG. 3 in dotted lines. It will be noted that the effect of the configuration given to the pole piece 49 is to increase the effective dimension of the air gap 47 in a direction parallel to the axis of the magnetic structure adjacent the neck 33. This increase may be proportioned to compensate for the leakage from the permanent magnet and to provide a substantially uniform scale distribution for the instrument. At the same time the thinness of the pole piece permits a maximum size of permanent magnet with low flux leakage.

The permanent magnet 45 preferably is constructed of a high-coercive magnetic material, preferably material having a coercive force of at least 200 oersteds. An alloy of aluminum, nickel, cobalt and copper, known as Alnico, has been found satisfactory for the permanent magnet, and such material may have a coercive force in excess of 400 oersteds. An Alnico permanent magnet having a coercive force ($Hc$) of about 700 oersteds has been found satisfactory.

It will be noted that the permanent magnet directs magnetic flux through the magnetic structure in two major paths. One flux line in each of these paths is illustrated in broken lines in FIG. 2. The flux line 51 represents one of the paths, whereas the flux line 53 represents the other of the paths.

In order to adjust the magnetic field in the air gap provision is made for varying the magnetic reluctance of part of the magnetic structure traversed by the magnetic flux. For example, the cross section of the neck 33 may be made adjustable for this purpose. However, a separate adjustment preferably is provided for each of the paths represented by the flux lines 51 and 53. To this end an opening 55 is provided in the ring 29 immediately to the left of the neck 33 as viewed in FIG. 2. This opening extends through the ring in a direction parallel to the axis of the magnetic structure. It may be of circular configuration, but preferably it is non-circular and the hexagonal configuration illustrated has been found suitable. A similar opening 57 is provided in the ring 29 immediately to the right of the neck 33 as viewed in FIG. 4.

Figure 4:
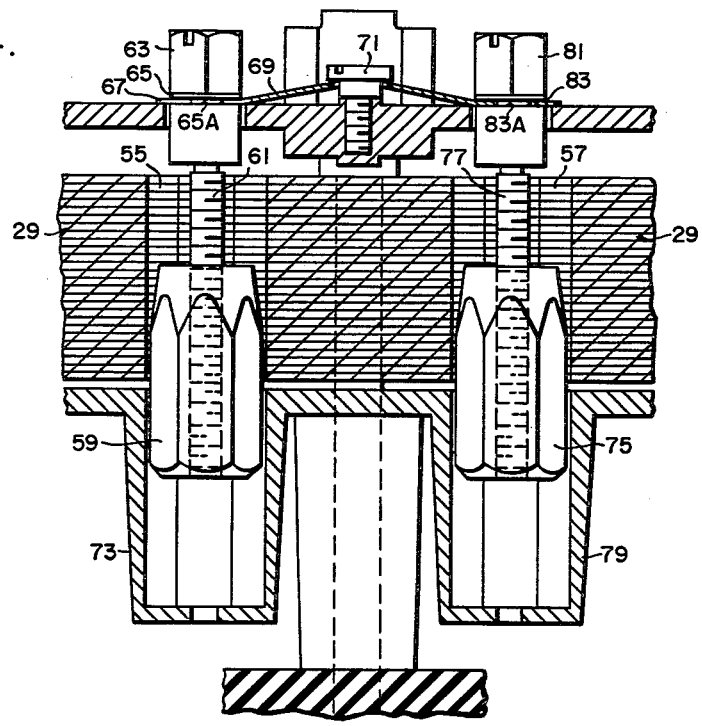
FIG. 4 is a view in sectional elevation with parts broken away taken on the line IV—IV of FIG. 6.

The opening 55 may have a size such that the remaining part of the ring 29 left by the opening saturates. The opening 55 serves as a guide for an adjuster 59 in the form of an elongated hexagonal nut 59 constructed of a soft magnetic material such as mild steel. As shown in FIG. 4 the nut 59 has conically tapered ends to facilitate movement of the nut into and along the opening 55. The nut is moved by means of a screw 61 having a head 63 provided with a groove 65. The groove 65 leaves a neck 65A for reception in a slot 67 provided in a spring strip 69. The spring strip is secured to the frame unit by means of a machine screw 71 and is bowed slightly more than illustrated in FIG. 4 in its free position to assure that the end of the spring is biased against the frame by the machine screw 71.

The lower part of the frame unit is provided with a cup or pocket 73 for reception of the nut 59 as the nut is moved out of the magnetic ring 29. The cup 73 has a hexagonally-shaped interior and consequently prevents rotation of the nut 59 relative to the stator unit. By inspection of FIG. 4 it will be observed that rotation of the screw 61 moves the nut 59 into or out of the magnetic ring 29. As the nut 59 moves into the ring 29, it decreases the magnetic reluctance of the path represented by the flux line 51 of FIG. 2 and consequently increases the magnetic flux in the portion of the air gap served by such path. In a similar manner a magnetic nut 75 is adjusted by a screw 77 from a position within the ring 29 to a position within a cup or pocket 79. Adjustment of the nut 75 varies the reluctance of the magnetic path represented by the flux line 53.

It will be noted that the screw 77 has a head 81 provided with a groove 83 which defines a neck 83A. This neck is proportioned for reception in a slot 85 located at the opposite end of the spring strip 69. It will be noted in FIG. 6 that the slots 67 and 85 extend at right angles relative to each other, and that each slot defines a fork having tines which are receivable in one of the grooves 65 or 83. The right angular relationship of these slots or forks facilitates assembly and disassembly of the associated parts.

The provision of two series adjusters for the magnetic paths provides a very flexible control of the magnetic field in the air gap. Because of its location operation of the adjuster 59 alone operates primarily to adjust the strength of the magnetic field in the left-hand part of the air gap as viewed in FIG. 2. Adjustment of the adjuster 75 is effective primarily to adjust the magnitude of the magnetic field in the right-hand part of the air gap as viewed in FIG. 2. For a center-zero measuring instrument, wherein the coil 4 in its rest or deenergization condition is located symmetrically with respect to the magnetic structure, the movement of the coil in either direction may be adjusted by manipulation of the appropriate one of the adjusters. A further advantage of the construction illustrated in FIG. 2 is that the adjuster 75 may be operated to decrease the reluctance of the path represented by the magnetic flux line 53 slightly in order to compensate for the increase in reluctance in such path due to the presence of the passage filled by the plug 39. In order to adjust the magnitude of the entire magnetic field, both of the adjusters 59 and 75 may be advanced or retracted by substantially similar amounts.

The adjusters are particularly desirable for instruments employing the previously-mentioned filamentary elements for the reason that such instruments ordinarily do not have provision for adjusting their full-load indications. It is possible to adjust such an instrument by varying the magnetism of the permanent magnet 45, but this is an awkward procedure, particularly when an adjustment is desired after the instrument leaves the factory.

Frame Unit

Figure 5:
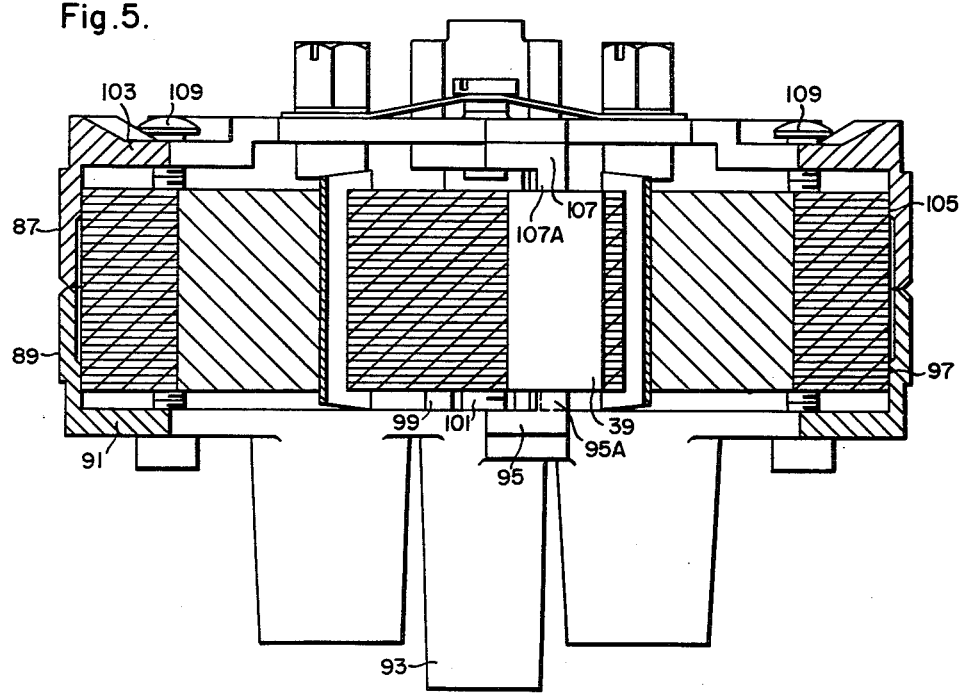
FIG. 5 is a view in sectional elevation with parts omitted taken along the line V—V of FIG. 6.

As shown in FIGS. 1, and 5 the frame unit 9 includes two rings 87 and 89 which surround the cylindrical magnetic structure 7. The lower ring 89 has an in-turned flange 91 which underlies the magnetic structure and which has secured thereto a plurality of spacers 93 which space the frame from the base 11. The ring 89 has secured diametrically thereacross the bridge 15 which is employed in mounting the rotor unit 3. The ring 89 also has secured to it the cups or pockets 73 and 79 of FIG. 4 for receiving the adjusters. One of these cups and pockets 73 is illustrated in FIG. 1. The ring 89 has secured thereto an arm 95 which underlies the plug 39 (FIG. 5) and which has a small projection 95A engaging the plug bottom to prevent substantial downward movement of such plug under the influence of shock. The ring 89, the flange 91, the spacers 93, the pockets such as pockets 73, the arm 95 and the bridge 15 conveniently may be constructed integrally by casting from a suitable aluminum-base die-casting alloy or other material having adequate rigidity.

The ring 89 has an inner surface of stepped formation, the upper part of which is spaced from the magnetic structure. However, the lower part of the ring has a ledge 97 concentric about the axis 5 for engaging the lower part of the cylindrical surface of the magnetic structure 7. This ledge is machined with a surface of revolution to position the ring 89 accurately and concentrically with respect to the magnetic structure. The bottom of the magnetic structure 7 engages small pads 99 formed on the flange 91 adjacent each of the spacers 93 and is secured firmly in engagement with such pads by means of bolts 101. Each bolt extends through an opening provided in the magnetic structure 7 through a spacer 93 and the base 11. The ledge 97 and the pads 99 have their surfaces engaging the magnetic structure 7 accurately machined to assure accurate positioning of the frame relative to the magnetic structure.

The ring 87 also has a flange 103 extending inwardly over the upper part of the magnetic structure 7 as viewed in FIGS. 1 and 5. The inner surface of the ring 87 is of stepped formation and is clear of the cylindrical surface of the structure 7 except for a small ledge 105 which has a surface of revolution about the axis 5 accurately machined to receive snugly the upper part of the magnetic structure. Thus, the parts of the frame which actually engage the magnetic structure are kept to a minimum.

The ring 87 also has secured thereto an arm 107 which extends over the upper face of the plug 39 (FIG. 5) and which has a small projection 107A engaging the top of the plug to prevent upper movement of the plug as viewed in FIG. 5 relative to the frame unit under the influence of shock. The cantilever bridge 13 is secured to the upper ring. The upper ring is secured to the lower ring by a plurality of machine screws such as the screw 109. The ring 87, the arm 107, and the bridge 13 conveniently may be cast as a unit from a suitable material such as an aluminum-base die-casting alloy. It will be understood that the meeting faces of the rings 87 and 89 are machined accurately to assure proper positioning of all parts of the frame unit.

Figure 7:
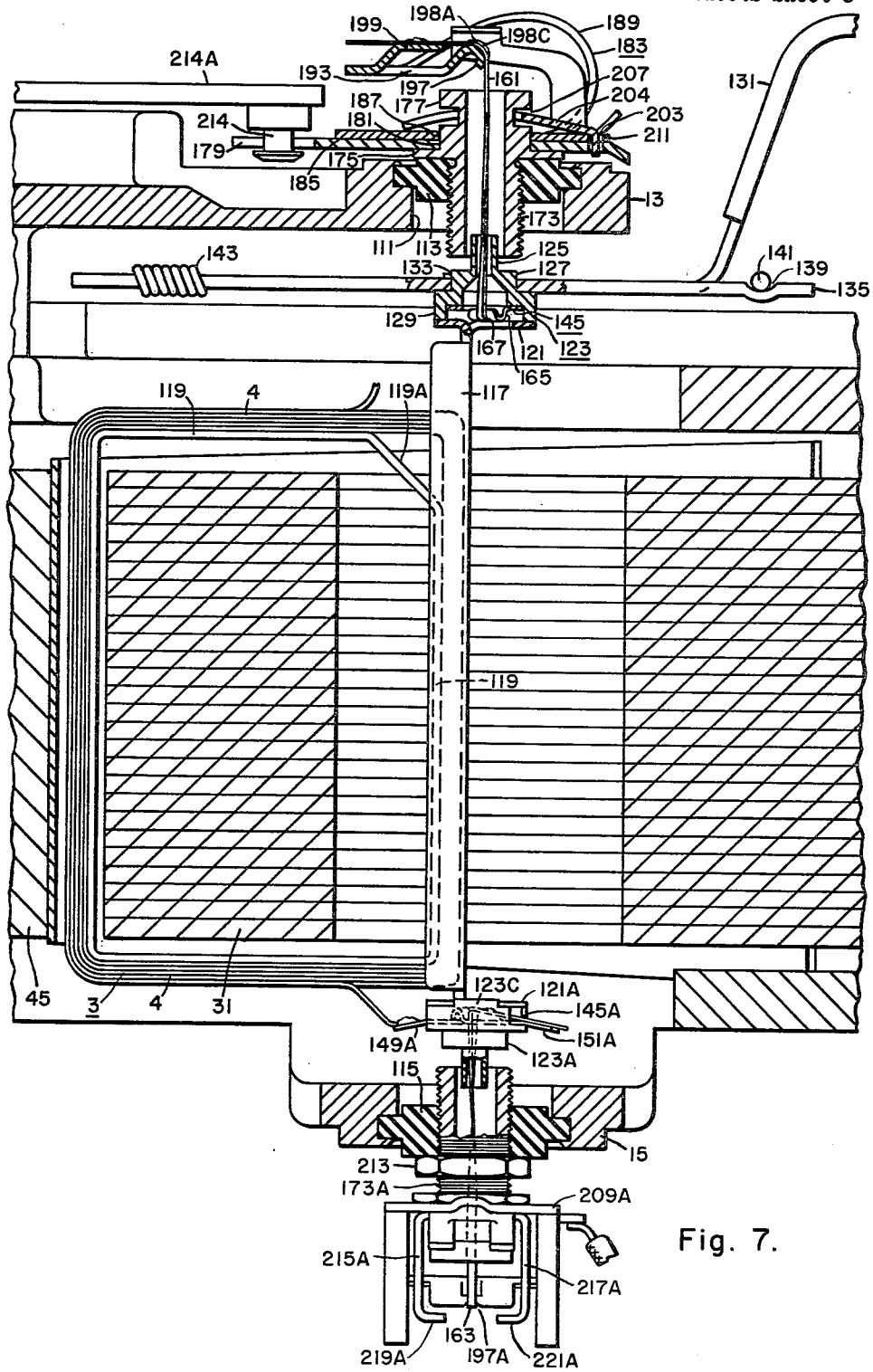
FIG. 7 is a view in sectional elevation with parts broken away taken on the line VII—VII of FIG. 6, but with the rotor unit of FIG. 6 moved to its center-scale position.

By reference to FIG. 7 it will be noted that the bridge 13 has a circular opening 111 of stepped formation therein. A disc 113 of insulating material such as a phenolic resin is located in the larger part of the stepped formation and is secured in place in any suitable manner as by staking. In a similar manner a disc 115 is mounted in the bridge 15. These discs are employed in mounting the rotor unit with respect to the stator unit and will be discussed below.

Rotor Unit

Referring to FIG. 7, the rotor unit 3 includes a bracket 117 which may be constructed of a lightweight material such as aluminum. The aluminum is bent into a channel configuration to receive one side of the coil 4. The coil may be secured to the bracket in any suitable manner as by cement. The coil 4 includes a number of turns of electroconductive wire which may be coated with a conventional insulating material such as enamel and is wound in a substantially rectangular configuration.

The coil surrounds a substantially rectangular damping loop or ring 119 of electroconductive material such as aluminum. Preferably, the aluminum has a rectangular cross-section. The relationship of the coil to the damping ring may be as shown in FIG. 8. Since the damping ring has a rectangular cross-section, the resistance thereof may be modified readily by varying the width of the cross-section. Consequently, any desired amount of damping may be provided by selecting the proper width of the cross-section. If desired, a long tube or cup for the damping ring may be constructed, as by drawing a cup from flat aluminum sheet and sections of the cup may be severed or slit for the purpose of providing damping rings having widths selected to provide the desired resistance. A portion of the damping ring preferably is accessible for severance. Preferably, the severable portion is located adjacent one corner of the rectangle formed by the coil. By inspection of FIG. 7 it will be noted that the severable portion 119A of the damping ring extends diagonally across a corner of the coil. This locates the severable portion in available space and positions it for ready severance. Consequently, if damping from the damping ring is not required, the portion 119A of the damping ring may be cut.

In order to construct the coil of FIG. 7 the damping ring 119 may be mounted on a suitable mandrel or arbor having a shape similar to that desired for the ring, and a temporary filler may be located over the severable portion 119A to complete a rectangular outline. The desired number of turns of wire then may be wound about the damping ring and filler, and the turns may be cemented to each other to form a self-supporting coil. After the cement has set, the filler may be removed and the coil together with its damping ring may be removed from its mandrel.

The upper part of the bracket 117 is bent to form a platform 121 extending at right angles to the axis of the instrument. This platform is secured to a tower 123 of stepped formation. Thus, the tower has a tubular portion 125 projecting from a cylindrical portion 127 which in turn projects from a cylindrical base portion 129. The tower may be secured to the platform 121 in any suitable manner as by cementing or staking.

A pointer 131 has an opening 133 proportioned to receive snugly the cylindrical portion 127 of the tower. The tower then may be secured in any suitable manner to the pointer as by a staking operation.

Figure 6:
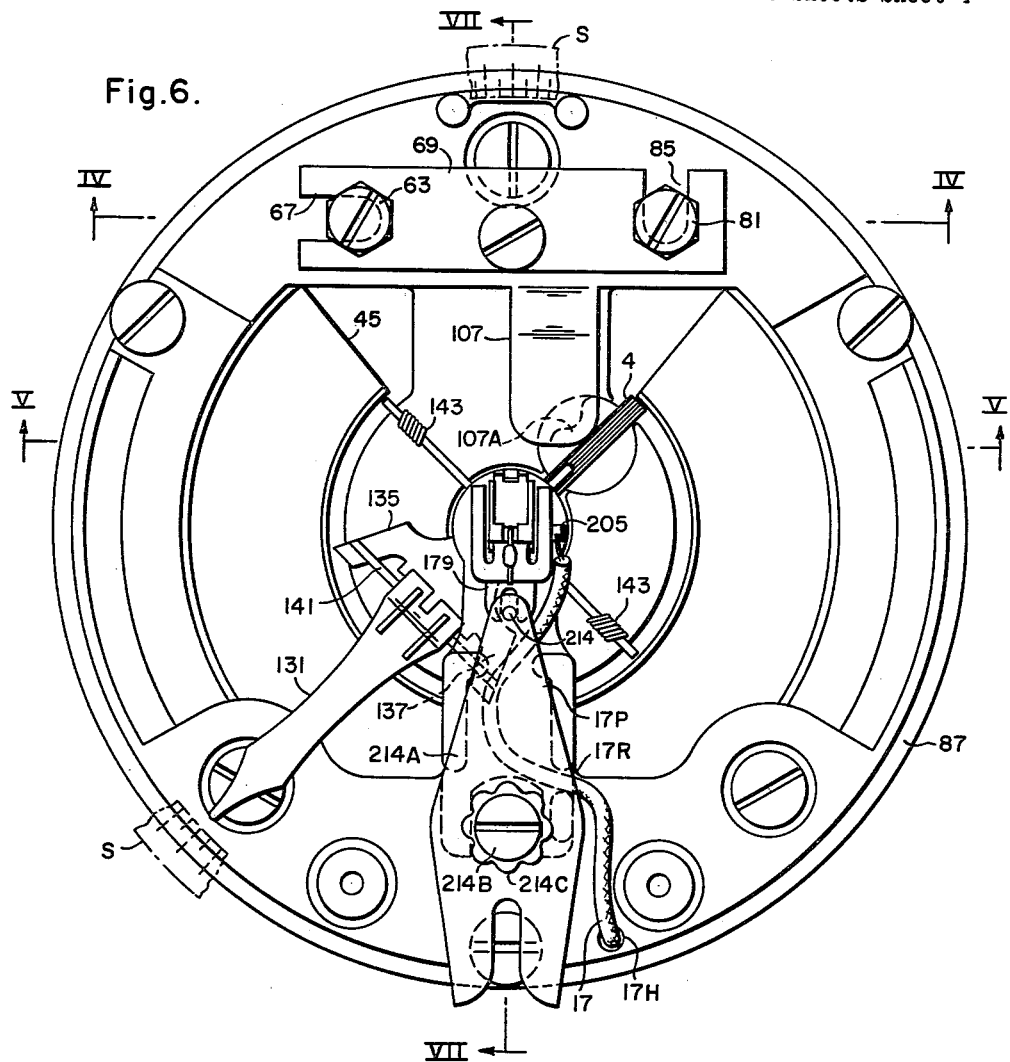
FIG. 6 is a view in top plan with parts broken away of the instrument shown in FIG. 1; but with the rotor unit in left-zero position.

As shown in FIG. 6 a scale S, portions of which are shown in broken lines extends adjacent the path of travel of the end of the pointer 131. The pointer has a "left-zero" position in FIG. 6 wherein it is at the left-hand end of the scale S when the instrument is deenergized.

The pointer 131 partially balances the coil 4 and the damping ring 119. Additional balancing of these components is obtained by a fork of a light-weight material such as aluminum secured to the pointer and having two tines 135 and 137 (FIG. 6). As shown in FIG. 7 the tines are provided with recesses 139 for receiving round wire 141, the wire being cemented to the tines. This forms an unusually convenient balancing weight for the reason that many accurate diameters of various wires such as copper and aluminum wire are available for balancing purposes. A wire having a density greater than that of the fork, as copper wire, has been found suitable for present purposes. By inspection of FIG. 6 it will be noted that the wire extends transversely for equal distances on opposite sides of the plane of the coil 4. Preferably, the wire 141 is selected to overcompensate slightly for the weight of the coil and damping ring. The final balance of the rotor unit then is obtained by adjusting balancing weights 143 on cruciform arms attached to the pointer.

Returning to the tower 123 it should be noted that the base of the tower has an internal cylindrical recess providing a seat for an anchor or fulcrum 145.

The anchor also is shown in FIGS. 15 and 16 associated with a tower 281 which is similar to the tower 123 except for a leg formation. Similar parts of the tower will be identified by the same reference characters employed for the corresponding parts of the tower 123 except for the addition thereto of the suffix letter "B." The anchor 145 is constructed of sheet brass and has a central disc or ring portion 147 with two arms 149 and 151 projecting in opposite directions from the disc portion. These arms project through notches 153B and 155B provided in the wall of the tower 281. The disc 147 may be secured in any suitable manner as by cementing or staking. For present purposes, it will be assumed that the disc is staked in position at four positions. The anchor will be discussed in greater detail below.

A similar tower 123A and anchor 145A are provided for the lower end of the bracket 117, and the construction and attachment of these items will be understood from the preceding discussion. However, the two towers 123 and 123A are displaced from each other angularly about the axis of rotation of the instrument by a distance of 90°. To facilitate the utilization of similar parts, the towers are mounted at an angle relative to the coil unit and pointer 131 as shown in FIG. 15, wherein the plane of the coil is illustrated by a dotted line 156. It will be noted that preferably the two arms 149 and 151 make an angle θ of 45° with the dotted line. This facilitates the utilization of similar towers and anchors for both ends of the bracket 117 for receiving filamentary elements displaced 90° angularly about the axis of rotation. By inspection of FIG. 7 it will be noted that the tower 123A has legs 123C extending on opposite sides of the platform 121A which corresponds to the platform 121 previously described. These arms may be employed in staking these parts together or to increase the adhesion of the parts if cement is employed.

It will be noted from FIG. 7 that one lead for the coil 4 is connected to the arm 149A of the anchor 145A. In a similar manner the remaining lead of the coil is connected to an arm of the anchor 145. Because of these connections the anchors must be insulated from each other, and such insulation may be provided in any desired manner. In a preferred construction, the towers and the bracket 117 are provided with an insulating coating which may be similar to that described in the McCulloch Patent 1,751,213 which issued March 18, 1930. Such a coating provides adequate insulation of the parts and also facilitates sturdy connections of the towers to the bracket.

*Rotor Unit Mounting*

The rotor unit is mounted for rotation with respect to the stator unit by means of two filamentary elements 161 and 163. These filamentary elements constitute the only connections between the rotor and stator units and twist to permit rotation of the rotor unit.

Although each of the filamentary elements may have a circular cross section it is found desirable to provide a non-circular cross section. This facilitates mounting of the filamentary element in strain-free condition. In a preferred embodiment of the invention the filamentary element takes the form of a strip, band or ribbon having a substantially rectangular cross section. The ratio of width to thickness of the filamentary element preferably is selected within the range of 7 to 15. In the design of the filamentary element the shear stress of the element is determined primarily by thickness. Consequently, the thickness may be selected within the limits permitted by shear stress. The width of the element then may be selected to provide the desired remaining properties.

A material employed for the filamentary element is elected to provide adequate resilience, strength, ease of securing and corrosion resistance. If the filamentary element is employed for conducting electric current, it preferably should have a reasonably low resistance and a reasonably low temperature coefficient of resistance. Because of the extremely small cross section of the filamentary element, stability and freedom from corrosion are of great importance. The noble metals are suitable from these standpoints, and platinum has been found particularly satisfactory. The platinum is alloyed with one or more additional materials for the purpose of imparting adequate physical properties to the resultant alloy. Thus, iridium or nickel may be employed as an addition to platinum in an amount sufficient to provide the desired properties. As a specific example, 8.5% of nickel by weight and 91.5% of platinum may be employed as the alloy.

Although the dimensions of the filamentary element depend upon the design of the instrument with which it is associated, the following dimensions have been found suitable for a platinum-nickel alloy employed with a rotor unit having a weight of the order of one gram. The filamentary element may have a thickness of 0.0005 inch, a width of 0.0055 inch and an effective length along the axis of rotation of 0.4 inch. Such a filamentary element has been employed for a rotor unit having a range of angular deflection about its axis of the order of 270°.

The effective length of the filamentary element which twists in response to rotor unit revolution preferably is maintained as short as practicable. For example, the effective axial length in inches along the axis of revolution of the rotor unit preferably is less than the range of angular rotation of the rotor unit in degrees divided by 300. With the previously mentioned effective length of 0.4 inch and the angular rotation of 270°, the effective length of the filamentary element in inches is less than the range of angular rotation in degrees divided by 650.

Although the filamentary elements may be employed directly after fabrication, preferably they are strain relieved. Such strain relief may be obtained by subjecting the filamentary elements to a sufficient amount of degree-hours of heat. For example, it has been satisfactory to strain relieve the platinum-nickel alloy by heating the alloy after fabrication to 400° C. for two hours. This treatment materially improves the physical and electrical properties of the alloy.

The lower end of the filamentary element 161 is secured to the rotor unit through the anchor 145 (FIG. 8). To this end the disc or ring 147 is provided with a centrally disposed opening defining a tongue 165. The tongue is provided with a cylindrical surface 167 which is tangent to that portion of the filamentary element which extends along the axis of rotation of the rotor unit. The cylindrical surface 167 has ribs 169 and 171 on each side thereof to define a groove for receiving the filamentary element and for restraining movement of the filamentary element in directions transverse to the axis of rotation. The filamentary element passes around the cylindrical surface 167 and has its end soldered or otherwise secured to the arm 151. A notch 151A may be provided in the end of the arm 151 to facilitate centering of the element 161.

The spacing of the ribs 169 and 171 may be proportioned to receive snugly therebetween the filamentary element 161. Preferably, however, the spacing of these ribs is slightly less than the width of the filamentary element. The disc 145 is then constructed of a material substantially softer than the material of the filamentary element. For example, the disc may be constructed of a soft brass such as that commercially known as soft jeweler's brass. When the parts are placed in their operating positions, the ribbon then cuts its own seat in the soft brass and thus maintains an accurate constant position with respect to the disc. The filamentary element 163 is connected in a similar manner to the disc 145A.

The upper end of the filamentary element 161 as viewed in FIGS. 7 and 8 is secured to the stator unit by an assembly which now will be described. It will be recalled that the bridge 13 is provided with an insulating disc 113. This disc has a threaded opening for receiving in threaded engagement a hollow screw 173. The screw 173 has a hexagonal head 175 which firmly engages the disc 113. The hexagonal head 175 has a cylindrical portion 177 projecting therefrom. This cylindrical portion has rotatably mounted thereon a zero-adjuster arm 179 which has an opening 181 proportioned to receive snugly the cylindrical portion 177. A spring 183 is next mounted on the cylindrical portion 177. This spring has a base portion 185 which has an opening 187 proportioned to receive snugly the cylindrical portion 177. The spring also has a cantilever spring portion formed by two arms 189 and 191 which extend over the base portion as viewed in FIGS. 7 and 8. The spring has a second cantilever portion formed by arms 193 and 195 which form a re-entrant portion extending from the free end of the first cantilever portion towards the axis of rotation of the rotor unit. It will be noted that the second cantilever portion terminates in a fulcrum or guide 197 for receiving the upper end of the filamentary element 161. The guide 197 may be similar in construction to the tongue 165 employed for the lower end of the filamentary element. However, since the spring is formed of hard material it presents ribs 198A and 198B which are spaced apart sufficiently to receive snugly therebetween the element 161 which passes over a cylindrical surface 198C. The spring 183 additionally includes a platform 199 which extends in a plane transverse to the axis of rotation of the rotor unit and tangent to the guide 197. The end of the filamentary element 161 passes around the guide 197 and is suitably secured to the platform 199 as by soldering. A notch 199A may be provided for assisting in centering the filamentary element during assembly.

The spring 183 may be constructed of any suitable spring material such as Phosphor bronze. In a preferred embodiment of the invention the spring is constructed of a suitably heat-treated beryllium-copper alloy. A suitable alloy contains 1.8% to 2.05% by weight of beryllium, the remainder being copper.

Figure 9:
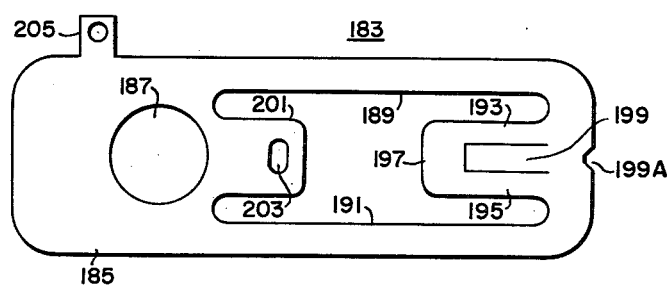
FIG. 9 is a view in top plan of a spring blank for the instrument of FIG. 1 shown at an intermediate stage of manufacture.

The spring 183 is shown in developed form in FIG. 9 and may be punched in such form from a strip or sheet of beryllium-copper alloy. A slit is provided for outlining the platform 199 and this platform is subsequently bent upwardly from the plane of a sheet. In addition, the guide 197 subsequently is formed into the desired form for guiding the filamentary element. It will be noted that the spring 183 includes a tongue 201 provided with an opening 203 for a purpose which will be discussed below. In addition, a tab 205 may be provided to which a conductor may be subsequently soldered.

Although the spring 183 may be bent directly to the desired form and so used, preferably the spring is heat-formed. For optimum performance, the spring is bent to a predetermined shape and held in such shape while it is heat treated.

A suitable fixture for holding the spring during heat forming is shown in FIG. 10. The spring has one end located on a form 207 by two pins 207A which are mounted on the form. The remaining end of the spring is clamped to the form 207 by a clamping member 207B which is detachably secured to the form 207 by machine screw (not shown).

The form 207 has a recess for receiving an insert 207C which extends between the arms 189 and 191 and which is detachably secured to the form 207 by a pin 207D. The insert has a projection 207E which fits within the curve of the guide 197 and is recessed to receive the platform 199.

A positioning member 207F has a flange cooperating with the pins to retain the adjacent end of the spring properly located. The member 207F is detachably secured to the form 207 by screws (not shown).

While held in the fixture, the spring is subjected to a suitable number of degree-hours of heat. For example, the spring may be heated to a temperature of 700° F. for ⅔ of an hour.

The re-entrant construction of the spring provides an unusually long spring in a small space. Furthermore, the double-cantilever construction permits a large deflection of the guide 197 in directions parallel to the axis of rotation of the rotor unit without substantial deviation in a direction radial to such axis. Thus, springs constructed in accordance with the invention permit a deflection of the guide 197 in an axial direction for distance of the order of 8 mils with a radial deviation which does not exceed 1 mil.

Preferably the spring has a soft deflection gradient. For example, the spring may have tautness-to-weight ratio of the order of 100. That is for a rotor unit weighing 0.9 gram a force of about 90 grams may be exerted on the filamentary elements. This force may suffice to move the upper left-hand end of the spring 183 in FIG. 7 about ⅓ inch from its unstressed position.

In order to retain the parts in assembled position the cylindrical portion 177 is provided with a peripheral groove 207 which defines a neck for reception in a fork-ended spring clip 209. The fork of the clip 209 has tines received partially within the annular groove 207 and are bowed for the purpose of urging the base portion of the spring 183 and the zero adjuster arm 179 towards the hexagonal head of the screw. This fork construction will be discussed further below. The clip also has a tongue 211 which passes through the opening 203 in the spring 183 and through a similar opening in the zero adjuster arm 179. By inspection of FIG. 7, it will be noted that rotation of the zero-adjuster arm 179 about the axis of rotation of the rotor unit moves both the spring 183 and the clip 209 about such an axis.

The lower end of the filamentary element 163 is secured to the stator unit by an assembly which is similar to that associated with the filamentary element 161 with the exception that no zero adjuster arm ordinarily is required for the former assembly. For this reason the parts of the lower assembly will be identified by the same reference characters employed for corresponding parts of the upper assembly with the addition of the suffix letter A.

Inasmuch as a zero-adjuster arm is not required for the screw 173A, the screw is arranged for axial adjustment along its axis. To this end a lock nut 213 is provided for locking the screw in any position of adjustment.

The clips 209 and 209A are designed to form stops for the guides 197 and 197A. To this end the clip 209A has parallel arms 215A and 217A which are disposed on opposite sides of the axis of rotation of the rotor unit. It will be noted that the guide 197A is located between these arms and that the arms prevent excessive movement of the guide in directions transverse to the axis.

The arms 215A and 217A have attached thereto lips 219A and 221A which are bent to underlie the guide 197A as viewed in FIG. 7. Consequently, these lips prevent excessive downward movement of the guide 197A as viewed in FIG. 7.

It will be recalled that the filamentary elements preferably have a rectangular cross section. Although the two filamentary elements may have their effective lengths disposed on the axis of rotation of the rotor unit, in any planes extending through the axis, preferably these lengths are displaced from each other angularly about the axis. For angular movements of the rotor unit in excess of 90°, it is preferred to maintain a displacement of the planes of the filamentary elements angularly about the axis of rotation at 90°. Thus, when the rotor unit is in its rest or deenergized position, the plane of the filamentary element 161 along the axis of rotation may be transverse to the paper as viewed in FIG. 7, whereas the plane of the filamentary element 163 along the axis of rotation is parallel to the plane of the paper. This relationship of the filamentary elements has been employed in instruments having ranges of rotation in excess of 250°.

Operation of the zero-adjuster arm 179 will modify the transverse relationships of the two filamentary elements slightly, but this variation does not noticeably affect the performance of the instrument.

The zero-adjuster arm 179 has a forked-end for reception of a pin 214 secured to one end of an operating arm 214A which may be constructed of an insulating material such as a phenolic resin. The arm 214A is pivotally mounted on the stator unit by means of a machine screw 214B and is held in any position of adjustment by a dished spring 214C.

By reference to FIG. 6 it will be noted that the conductor 17 has a portion loosely disposed in a pocket 17P to facilitate movement of the zero-adjuster arm. The conductor leaves the pocket through a small opening 17R and then passes through a hole 17H provided in the stator unit.

The assembly of the instrument now may be considered. It will be assumed that the rotor unit is complete and that one end of each of the filamentary elements is secured to the rotor unit. By inspection of FIG. 7 it will be noted that each of the towers 123 and 123A is spaced to provide an axial clearance from its associated screw 173 and 173A. This clearance may be of the order of 0.020 inch. Consequently, spacers of these dimensions are inserted to maintain the rotor unit in its proper axial position.

The spacing of each of the guides 197 and 197A from its associated lips such as lips 219 or 219A may be of the order of 0.015 inch. Spacers of this value are inserted to maintain the guides in their proper positions. With the parts accurately spaced in this manner, both axially and radially, the filamentary elements are placed in the positions illustrated in FIG. 7 (but with the coil in its deenergized or rest position) drawn snug and soldered to their associated springs 183 or 183A. The spacers now may be removed.

The construction of the instrument makes it highly immune to vibration and shock. Thus, if the rotor unit is displaced upwardly with respect to the stator unit under the influence of shock, the guide 197 engages the lip 219 to relieve the filamentary element after the displacement has reached a value of 0.015 inch. When the displacement has reached a value of 0.020 inch, the tower 123 engages the screw 173 to prevent further movement of the rotor unit. In a similar manner the tower 123A, the screw 173A and the lips 219A and 221A protect the rotor unit and the suspension from damage due to displacement of the rotor unit in a downward direction as viewed in FIG. 7.

It will be noted that each of the towers 123 or 123A has a tubular part projecting inside, and having clearance from, the associated tubular screw 173 or 173A. These telescoping parts prevent excessive movement of the rotor unit relative to the stator unit in directions transverse to the axis of rotation.

*Universal Instrument*

It will be recalled that permanent-magnet moving-coil instruments are employed for measuring both voltage and current. These operations of the instrument were discussed above in connection with the operation of the switch 21 of FIG. 1.

In either application the complete instrument unit should dissipate as little energy as practicable from the circuit which is being measured. To this end, an ammeter should have a low resistance and a voltmeter should have a high resistance.

The industry has standardized essentially on a permanent-magnet moving-coil voltmeter which has a rating of 1000 ohms per volt for most voltage measurements. This means that the resistor 23, together with the internal resistance of the voltmeter instrument has a resultant value of 1000 ohms for each volt of the reading of the voltmeter in its full-scale position. To satisfy this requirement the voltmeter instrument should be designed to reach its full-scale position when energized by a current of 1 milliampere.

A permanent-magnet moving-coil ammeter instrument for higher current values commonly is energized from the output terminals of a shunt such as the shunt 27 of FIG. 1. In order to minimize energy loss, a shunt having a low voltage output is employed. The industry essentially has adopted a standard output for switchboard shunts which is 50 millivolts. This means that the ammeter should reach its full scale position when an input of 50 millivolts is applied to its input terminals.

Thus, for a universal switchboard instrument of the permanent-magnet moving-coil type the instrument should reach a full scale position for a current input of 1 milliampere, and such a current should be available when a voltage of 50 millivolts is applied to the terminals of the instrument. No prior art instrument of this type is known which is capable of such performance.

A further problem is presented in universal instruments by the preferred damping. When the switch 21 of FIG. 1 is operated to connect the instrument to the shunt 27, the shunt provides substantial damping for the instrument in a manner well known in the art. However, when the switch is operated to its left-hand position for energization in accordance with the voltage of the associated circuit, the damping provided by the shunt no longer is available, and it is the practice to employ a damping ring in association with the instrument coil for obtaining the required damping.

In applicant's universal instrument the rotor unit is designed with the minimum weight practicable. To this end all components including the coil are constructed of materials having as light a weight as possible. In a preferred embodiment of the invention the coil is constructed of aluminum wire. Although aluminum has higher electrical resistivity than copper, the lower weight of the aluminum more than off-sets the increased cross-section of aluminum required for the coil. As a specific example, the coil may be constructed of 69 turns of 0.0056 inch diameter aluminum wire insulated with enamel. Such a coil may have a resistance of the order of 9 ohms.

It will be recalled that applicant employs short filamentary elements having a rectangular cross section. It also will be recalled that the length of each filamentary element along the axis of rotation may be of the order of 0.4 inch. The specific filamentary elements herein described have a resistance of the order of 3.5 ohms, giving a total resistance for the instrument movement of only 12.5 ohms.

When the instrument is energized from a standard switchboard shunt, an input of 50 millivolts is available. For this voltage to drive 1 milliampere through the coil, a total resistance of the order of 50 ohms is required. Since the coil and filamentary elements have a total resistance of 12.5 ohms, this means that a swamping resistance of 37.5 ohms may be employed in series with the coil. Such a resistance is designed to have a negligible temperature coefficient of resistance in order to reduce to acceptable proportions the over-all temperature coefficient of resistance of the coil, filamentary elements and swamping resistance.

With the construction thus far outlined, the instrument may have a ratio of torque to weight of the rotor unit of the order of 0.55. With the negligible friction introduced by the filamentary elements, this ratio results in satisfactory operation of the instrument.

By appropriate adjustments of the swamping resistance the instrument herein described may be employed with shunts having other voltage outputs, for example, in the range of 35 to 100 millivolts. However, the 50 millivolt shunt application is the preferred one.

It is possible to design an instrument for another universal range. For example, an instrument may be designed to have a full-scale deflection for a current of 5 milliamperes. For use with a 50 millivolt shunt the instrument together with its swamping resistance would have a total resistance of 10 ohms. When employed as a voltmeter a resistance of 200 ohms per volt would be required. Such an instrument would be less desirable because of the increased energy loss which it introduces.

In order to provide preferred damping of voltmeters and ammeters, the universal instrument preferably has a severable damping ring as above described. Consequently, when the instrument is employed as an ammeter in association with the shunt which provides the desired damping, the damping ring may be severed in the manner previously described to render the damping ring ineffective. However, when the instrument is to be employed as a voltmeter, the damping ring is left intact, and may be proportioned to provide the desired damping.

*Alternate Spring Construction*

Figure 11:
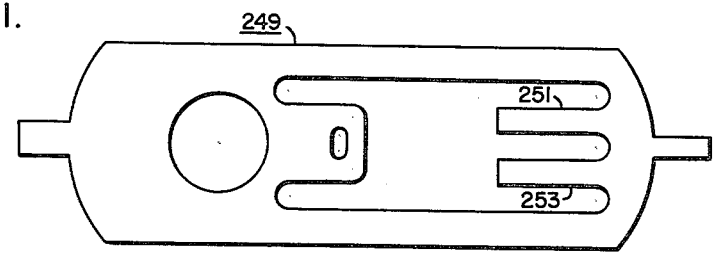
FIG. 11 is a view in top plan of a modified spring blank shown at an intermediate stage of manufacture.
Figure 12:
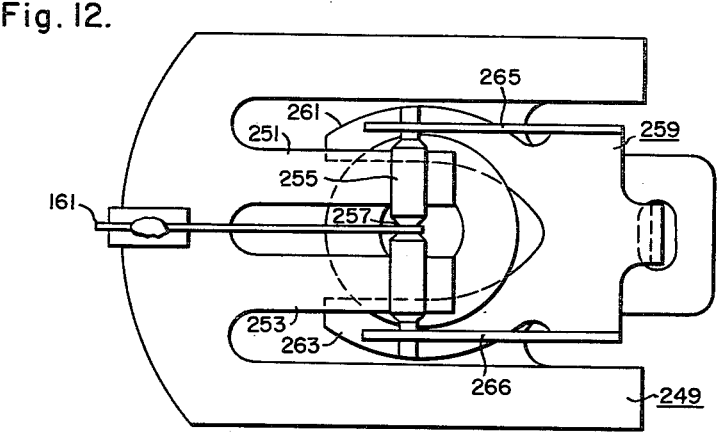
FIG. 12 is a view in top plan of a suspension employing the spring blank represented in FIG. 11.

In FIG. 11 a spring 249 is illustrated in developed form which may be employed in place of the spring 189 of FIG. 9. The spring of FIG. 11 has two arms 251 and 253 which replace the arms 193 and 195 of FIG. 9. The arms 251 and 253 are proportioned to extend on opposite sides of the axis of rotation of the instrument when the spring is in operating position. A guide pin 255 is connected to the free ends of the arms 251 and 253 in any suitable manner as by soldering. This pin has a central portion of reduced diameter to form a neck 257 proportioned to receive snugly the filamentary element 161. When in operating position the neck 257 is positioned to be tangent to the portion of the filamentary element 161 which extends along the axis of rotation of the instrument. The pin 255 also has ends of reduced diameter.

The spring 249 may be assembled with the zero adjuster arm 179 on the screw 173 in a manner analogus to the mounting of the corresponding parts in the embodiment of FIG. 7. It will be noted that a spring clip 259 is provided which has a fork end providing tines 261 and 263. The fork end is similar to that provided for the clip 209. The tines 261 and 263 are proportioned to receive between them the neck formed by the annular groove 207 in the cylindrical portion 177 associated with the screw 173. By inspection of FIG. 13 it will be noted that the tines are bowed. When the tines are in operating position they exert pressure between the upper shoulder formed by the groove 207 and the base portion of the spring 249 to bias the base portion and the zero adjuster arm 179 downwardly as viewed in FIG. 13. The clip 259 has a tongue 264 which extends through openings in the spring 249 and the zero adjuster arm 179 to force these parts to rotate as a unit relative to the screw 173 about the axis of rotation of the instrument.

Figure 13:
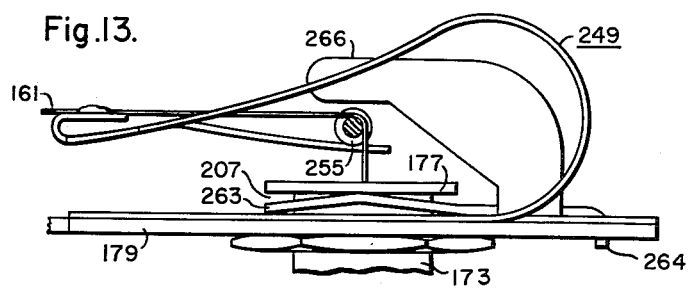
FIG. 13 is a view in side elevation showing the suspension of FIG. 12.

Wings or arms 265 and 266 project from the clip 259 to overlie the ends of the pin 255. When in operating position these arms are spaced from the pin 255 in a vertical direction as viewed in FIG. 13 to limit upward movement of the pin under conditions of shock. Such a spacing is illustrated in FIG. 13. It will be understood that the filamentary element extends around the pin 255 and has its end soldered or otherwise secured to the spring 249.

*Additional Shock Protection*

Although the instrument illustrated in FIGS. 1 to 7 has excellent safe guards against shock and vibration, additional damping may be provided as shown in FIG. 14. This damping is provided for each of the filamentary elements. Thus, in FIG. 14 the filamentary element 161 is shown in a screw 271 which may be employed in place of the screw 173 of FIG. 6. The only difference between the screws is that the screw 271 has an annular flange 273 formed in any suitable manner as by pressing a bushing into the screw interior to provide an opening 275 of reduced diameter for the filamentary element 161. This opening of reduced diameter is filled with a damping material such as a viscous grease or oil 276. In a preferred embodiment of the invention silicone oil is disposed in this restricted opening.

In operation the damping material does not interfere with correct twisting of the filamentary element. However, under conditions of shock or vibration the damping material offers substantial resistance and damping to movement of the filamentary element in directions radial relative to the axis of the screw 271. The damping material may be positioned to engage a median portion of the length of each of the filamentary elements which extends along the axis of rotation of the instrument.

*Alternate Tower Construction*

In the embodiment of FIG. 7 the towers 123 and 123A may be cemented to their respective platforms. In the embodiment of FIGS. 15 and 16 a tower 281 is illustrated which interlocks with a platform 280. The tower 281 of FIGS. 15 and 16 may be identical to the towers 123 and 123A of FIG. 7 except for the extension of two legs 283A and 283B from the tower parallel to the axis of rotation past opposite sides of the platform 280. These legs have recesses 287 and 289 formed therein to provide lips 291 and 293 underlying the platform 280 as viewed in FIG. 16. The tower 281 additionally may be secured to the platform 280 by cement.

During insertion, the anchor 145 may be tilted to clear the lips 291 and 293.

The platform 280 is in the form of a circular disc having a diameter slightly larger than the distance between the lips 291 and 292 and having portions removed to form two parallel edges 280A and 280B which are spaced apart in a direction transverse to the axis of rotation by a distance which is less than the spacing of the lips 291 and 293. The platform 280 may be removed from the tower by rotating it relative to the tower 90° about the axis of rotation of the rotor unit from the position illustrated in FIGS. 15 and 16. The platform then may be moved along the axis to clear the tower.

Certain subject matter herein disclosed is claimed in the Karl Palmer patent application, Serial No. 761,898, now abandoned, filed concurrently herewith, and assigned to the same assignee.

Although the invention has been described with reference to certain specific embodiments thereof, numerous modifications falling within the scope of the invention are possible.

I claim as my invention:

1. In a measuring instrument, a stator unit, a rotor unit, and mounting means mounting the rotor unit for rotation about an axis relative to the stator unit, said mounting means comprising a strain-free metallic filamentary element having a length extending along said axis, which may be twisted to permit relative rotation of the ends of the element about the axis, first securing means securing a first end of the element to the stator unit and second securing means securing a second end of the element to the rotor unit, said length in inches being less than the range of deflection in degrees of the rotor unit relative to the stator unit divided by three hundred, said element being strain-relieved to substantially eliminate zero set.

2. In a measuring instrument, a stator unit, a rotor unit, and mounting means mounting the rotor unit for rotation about an axis relative to the stator unit through an angle in excess of one hundred and twenty degrees, said mounting means comprising a first filamentary element having a length extending along said axis, first securing means securing a first end of the element to the stator unit, second securing means securing a second end of the element to the rotor unit, a second filamentary element spaced along said axis from the first filamentary element and having a length extending along said axis, third securing means securing a first end of the second filamentary element to the stator unit, and fourth securing means securing a second end of the second filamentary element to the rotor unit, each of the filamentary elements being twistable to permit relative rotation of the ends of each of the filamentary elements about the axis and being constructed of strain-free metallic material, said mounting means including tensioning means maintaining said element lengths under tension along said axis, said tensioning means comprising resilient parts connected in series and displaced angularly about said axis to permit variations in said lengths in response to twisting of the element lengths throughout the range of rotation of the rotor unit relative to the stator unit with negligible variation in said tension, and said tensioning means having each of said resilient parts deflect for maintaining each of said lengths within one mil of said axis over a range of variation of each of said lengths of eight mils along said axis due to twisting.

3. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising a spring device interposed between one of said units and the filamentary element, said spring device comprising an assembly including a base portion secured to said stator unit, a first yieldable cantilever portion extending substantially radially across said axis in a first direction, and a second yieldable cantilever portion extending substantially radially to said axis from the free end of the first cantilever portion, a positioning portion carried by said second cantilever portion adjacent said axis, said last-named securing means holding the filamentary element in engagement with said positioning portion, said base portion, first yieldable cantilever portion and second yieldable cantilever portion being constructed integrally of spring material, said first yieldable cantilever portion comprising two spaced first spring arms disposed on opposite sides of said axis and arcuate about a line extending transversely relative to the axis.

4. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising a spring device interposed between one of said units and the filamentary element, said spring device comprising an assembly including a base portion secured to said stator unit, a first yieldable cantilever portion extending substantially radially across said axis in a first direction, and a second yieldable cantilever portion extending substantially radially to said axis from the free end of the first cantilever portion, a positioning portion carried by said second cantilever portion adjacent said axis, said last-named securing means holding the filamentary element in engagement with said positioning portion, said base portion, first yieldable cantilever portion and second yieldable cantilever portion being constructed integrally of spring material, said first yieldable cantilever portion comprising two spaced first spring arms disposed on opposite sides of said axis, and said second cantilever portion comprising two spring arms located on opposite sides of a plane containing said axis and positioned between the first spring arms.

5. In a measuring instrument, a stator unit, a rotor unit, and mounting means mounting the rotor unit for rotation about an axis relative to the stator unit, said mounting means comprising a filamentary element having a length extending along said axis, first securing means securing a first end of the element to the stator unit, second securing means securing a second end of the element to the rotor unit, one of said securing means comprising a spring device interposed between one of said units and the filamentary element, said spring device comprising an assembly including a base portion secured to said stator unit, a first yieldable cantilever portion extending substantially radially across said axis in a first direction, and a second yieldable cantilever portion extending substantially radially to said axis from the free end of the first cantilever portion, a positioning portion carried by said second cantilever portion adjacent said axis, said last-named securing means holding the filamentary element in engagement with said positioning portion, said base portion, first yieldable cantilever portion and second yieldable cantilever portion being constructed integrally of spring material, said first yieldable cantilever portion comprising two spaced first spring arms disposed on opposite sides of said axis and arcuate about a line extending transversely relative to said axis, and said second cantilever portion comprising two spring arms located on opposite sides of a plane containing said axis and positioned between the first spring arms, and a tab formed integrally with said cantilever portions of said spring material and located substantially in said plane between the axis and the free end of said first yieldable cantilever portion.

6. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising a spring device interposed between one of said units and the filamentary element and soldered to the filamentary element, said spring device being constructed of a beryllium-copper alloy wherein the major constituent by weight is copper and having an arcuate configuration in unstressed condition.

7. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising a spring device interposed between one of said units and the filamentary element, said spring device comprising an assembly including a base portion secured to said stator unit, a first yieldable cantilever portion extending substantially radially across said axis in a first direction, and a second yieldable cantilever portion extending substantially radially to said axis from the free end of the first cantilever portion, a positioning portion carried by said second cantilever portion adjacent said axis, said last-named securing means holding the filamentary element in engagement with said positioning portion, said base portion, first yieldable cantilever portion and second yieldable cantilever portion being constructed integrally of spring material, said spring material being a beryllium-copper alloy wherein the major constituent by weight is copper, and said base portion being positioned between the positioning portion and the rotor unit.

8. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising a spring device interposed between one of said units and the filamentary element, said spring device comprising a first yieldable cantilever portion extending substantially radially across said axis in a first direction, and a second yieldable cantilever portion extending substantially radially to said axis from the free end of said first cantilever portion to provide a positioning portion adjacent said axis, said last-named securing means holding the filamentary element in engagement with said positioning portion, said positioning portion being resiliently yieldable in a direction transverse to the extensions of the cantilever portions, and stop means limiting movement of the positioning portion in said last-named direction.

9. In a measuring instrument, a stator unit, a rotor unit, and mounting means mounting the rotor unit for rotation about an axis relative to the stator unit, said mounting means comprising a filamentary element having a length extending along said axis, first securing means securing a first end of the element to the stator unit and second securing means securing a second end of the element to the rotor unit, said filamentary element being constructed of an alloy of platinum and a hardening ingredient, said alloy being strain-relieved to eliminate substantially zero set.

10. In a measuring instrument, a stator unit, a rotor unit, and mounting means mounting the rotor unit for rotation about an axis relative to the stator unit, said mounting means comprising a filamentary element having a length extending along said axis, first securing means securing a first end of the element to the stator unit and second securing means securing a second end of the element to the rotor unit, said filamentary element being constructed of an alloy of platinum and nickel, with platinum being the major ingredient by weight, said alloy being strain relieved to eliminate substantially zero set.

11. The method of fabricating a measuring instrument having a rotor unit and a stator unit which comprises fabricating a filamentary element from an alloy of platinum with a hardening ingredient, heating the element sufficiently to relieve the element of strains, and securing the element between the rotor unit and the stator unit to mount the rotor unit for rotation relative to the stator unit.

12. The method of fabricating a measuring instrument having a rotor unit and a stator unit which comprises fabricating a filamentary element from an alloy of platinum with nickel, said platinum constituting at least 85% by weight of the alloy, heating the element sufficiently to relieve the element of strains, and securing the element between the rotor unit and the stator unit to mount the rotor unit for rotation relative to the stator unit.

13. In a measuring instrument, a stator unit having first terminals, an electrically-energizable rotor unit having second terminals to be connected to the first terminals of the stator unit, and mounting means mounting the rotor unit for rotation about an axis relative to the stator unit, said mounting means comprising an electro-conductive twistable first filamentary element having a length extending along said axis, first receiving means securing a first end of the element to the stator unit, second securing means securing a second end of the element to the rotor unit, an electroconductive twistable second filamentary element spaced along said axis from the first filamentary element, and having a length extending along said axis, third securing means securing a first end of the second filamentary element to the stator unit, and fourth securing means securing a second end of the second filamentary element to the rotor unit, said stator unit including insulation between said first securing means and said third securing means, said mounting means including tensioning means maintaining said element lengths under tension along said axis, said second and fourth securing means each including an electroconductive aluminum part normally clear of said stator unit but operable into engagement with the stator unit in response to displacement of the rotor unit in directions other than those representing rotation about said axis, said rotor unit comprising an electrical coil, and a metallic supporting part extending between said aluminum parts, and an insulating coating applied to certain of said parts to provide an insulating coating between adjacent surfaces of said parts.

14. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising an anchor having a cylindrical surface tangent to said length for guiding an end of said filamentary element away from said axis, said anchor being constructed of a material substantially softer than the material of said filamentary element, whereby the element tends to seat itself in the anchor.

15. In a measuring instrument, a stator unit, a rotor unit, and mounting means mounting the rotor unit for rotation about an axis relative to the stator unit, said mounting means comprising a filamentary element having a length extending along said axis, first securing means securing a first end of the element to the stator unit, second securing means securing a second end of the element to the rotor unit, one of said securing means comprising an anchor having a cylindrical surface tangent to said length for guiding an end of said filamentary element away from said axis, said anchor being constructed of soft brass and said filamentary element being constructed of a hardened platinum alloy which is substantially harder than said brass, whereby the filamentary element tends to seat itself in the brass.

16. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising an anchor having a cylindrical surface tangent to said length for guiding an end of said filamentary element away from said axis, said anchor being constructed of a material substantially softer than the material of said filamentary element, said anchor having circular ribs concentric with the axis of said surface and disposed on each side of said filamentary element, said ribs being spaced in the direction of the last-named axis by a distance less than the corresponding dimension of the filamentary element, whereby the filamentary element tends to seat itself in said ribs.

17. In a measuring instrument, a stator unit, a rotor unit, and mounting means mounting the rotor unit for rotation about an axis relative to the stator unit, said mounting means comprising a twistable filamentary element having a length extending along said axis, first securing means securing a first end of the element to the stator unit, second securing means securing a second end of the element to the rotor unit, one of said securing means comprising an anchor having a cylindrical surface tangent to said length for guiding an end of said filamentary element away from said axis, said anchor being constructed of a material substantially softer than the material of said filamentary element, said anchor having circular ribs concentric with the axis of said surface and disposed on each side of said filamentary element, said ribs being spaced in the direction of the last-named axis by a distance less than the corresponding dimension of the filamentary element, whereby the filamentary element tends to seat itself in said ribs, said filamentary element having a rectangular section and having its width surface engaging the anchor.

18. A universal moving-coil measuring instrument comprising, a stator unit having an airgap arcuate about an axis and means for establishing a magnetic field in the airgap, a rotor unit comprising an electroconductive coil having a coil side disposed in said airgap, and a continuous electroconductive damping loop having a side disposed in said airgap, said loop and said coil being nested one within the other, said loop having a major portion engaging the coil and a minor portion spaced from the coil, said minor portion being accessible to facilitate severance thereof, means mounting the rotor unit for rotation relative to the stator unit about said axis, input leads for said coil, said instrument having a sensitivity such that one milliampere through said coil urges the coil substantially to its full-scale position, and the input resistance of the input leads and the coil in series not exceeding fifty ohms.

19. A universal moving-coil measuring instrument comprising, a stator unit having an airgap arcuate about an axis and means for establishing a magnetic field in the airgap, a rotor unit comprising an electroconductive coil having a coil side disposed in said airgap, said coil being wound with aluminum wire, and a continuous aluminum electroconductive damping loop mounted inside said coil, said loop having a side disposed in the airgap and having a portion spaced from the coil to facilitate severance of the loop, means mounting the rotor unit for rotation relative to the stator unit about said axis, said mounting means comprising a first filamentary element having a length extending along said axis, first securing means securing a first end of the element to the stator unit, second securing means securing a second end of the element to the rotor unit, a second filamentary element spaced along said axis from the first filamentary element and having a length extending along said axis, third securing means securing a first end of the second filamentary element to the stator unit, and fourth securing means securing a second end of the second filamentary element to the rotor unit, said mounting means including tensioning means maintaining said element lengths under tension along said axis, said filamentary elements being of twistable electroconductive material and constituting input leads for said coil, said instrument having a sensitivity such that one milliampere through said coil urges the coil substantially to its full-scale position, and the input resistance of the input leads and the coil in series not exceeding fifty ohms.

20. In a measuring instrument, a stator unit, a rotor unit, and mounting means mounting the rotor unit for rotation about an axis relative to the stator unit, said mounting means comprising a first filamentary element having a length extending along said axis, first securing means securing a first end of the element to the stator unit, second securing means securing a second end of the element to the rotor unit, a second filamentary element spaced along said axis from the first filamentary element and having a length extending along said axis, third securing means securing a first end of the second filamentary element to the stator unit, fourth securing means securing a second end of the second filamentary element to the rotor unit, said mounting means including tensioning means maintaining said element lengths under tension along said axis, first stop means for limiting displacement of the rotor unit along the axis relative to the stator unit in either direction from its operating position, said mounting means including stop means comprising coacting parts of the rotor and stator units, and second stop means for limiting displacement of the first end of each of the filamentary elements in response to movement of the rotor unit from its operating position towards the associated filamentary element to a value less than the value of displacement permitted by the first stop means.

21. In a measuring instrument, a stator unit, a rotor unit, and mounting means mounting the rotor unit for rotation about an axis relative to the stator unit, said mounting means comprising a first filamentary element having a length extending along said axis, first securing means securing a first end of the element to the stator unit, second securing means securing a second end of the element to the rotor unit, a second filamentary element spaced along said axis from the first filamentary element and having a length extending along said axis, third securing means securing a first end of the second filamentary element to the stator unit, fourth securing means securing a second end of the second filamentary element to the rotor unit, said mounting means including tensioning means maintaining said element lengths under tension along said axis, said tensioning means comprising spring means acting between the first ends and the stator unit to bias the first ends away from each other along said axis, said mounting means including first stop means limiting displacement of the rotor unit along the axis relative to the stator unit in either direction from its operating position to a first distance which is in excess of 0.015 inch, said stop means comprising parts fixed to the rotor and stator units respectively, and second stop means for limiting displacement of the first end of each of the filamentary elements relative to the stator unit in response to movement of the rotor unit from its operating position towards the associated filamenary element to a value which is less than the first distance.

22. In a measuring instrument, a stator unit establishing a magnetic field arcuate about an axis, a rotor unit comprising an electroconductive coil having a coil side in said field, and mounting means mounting the rotor unit for rotation about the axis relative to the stator unit, said mounting means comprising a first ribbon filamentary element having a length extending along said axis, first securing means securing a first end of the element to the stator unit, second securing means securing a second end of the element to the rotor unit, a second ribbon filamentary element spaced along said axis from the first filamentary element and having a length extending along said axis, third securing means securing a first end of the second filamentary element to the stator unit, fourth securing means securing a second end of the second filamentary element to the rotor unit, said filamentary elements being constructed of strain-relieved platinum alloy wherein the platinum constitutes at least 85% by weight of the alloy, said filamentary elements being connected respectively to the ends of the coil to serve as coil leads, said mounting means including beryllium-copper spring tensioning means maintaining said element lengths under tension along said axis, first stop means for limiting displacement of the rotor unit along the axis relative to the stator unit in either direction from its operating position, the stop means comprising coacting parts of the rotor and stator units, and second stop means for limiting displacement of the first end of each of the filamentary elements in response to movement of the rotor unit from its operating position towards the associated filamentary element to a value less than the value of displacement permitted by the first stop means.

23. In a moving-coil measuring instrument, a stator unit, a rotor unit, and mounting means mounting the rotor unit for rotation about an axis relative to the stator unit, said mounting means comprising an electroconductive supporting member having spaced first and second ends located on said axis, an electroconductive first filamentary element having a length extending along said axis, first securing means securing a first end of the element to the stator unit, second securing means securing a second end of the filamentary element to the first end of the supporting member, said second securing means including an electroconductive first terminal member electrically connected to the second end of the filamentary element, and insulating means insulating the first terminal member from the supporting member, an electroconductive second filamentary element spaced along said axis from the first filamentary element and having a length extending along said axis, third securing means securing a first end of the second filamentary element to the stator unit, and fourth securing means securing a second end of the second filamentary element to the second end of the supporting member, each of the filamentary elements being twistable to permit relative rotation of the ends of each of the filamentary elements about the axis, said fourth securing means including an electroconductive second terminal member electrically connected to the second end of the second filamentary element, said mounting means including tensioning means biasing the first ends of the filamentary elements away from each other, whereby the filamentary elements position the supporting member axially and radially relative to the axis while permitting rotation of the supporting member about the axis relative to the stator unit, an electroconductive coil having two leads connected respectively to the terminal members, said coil having a first coil side parallel to and radially spaced from the axis, said coil having a second coil side adjacent said axis and secured to the supporting member, and a magnetic structure having an airgap arcuate about said axis for receiving and establishing a magnetic field for the first coil side.

24. In a moving-coil measuring instrument, a stator unit, a rotor unit, and mounting means mounting the rotor unit for rotation about an axis relative to the stator unit, said mounting means comprising an electroconductive supporting member having spaced first and second ends located on said axis, an electroconductive first filamentary element having a length extending along said axis, first securing means securing a first end of the element to the stator unit, second securing means securing a second end of the filamentary element to the first end of the supporting member, said second securing means including an electroconductive first terminal member electrically connected to the second end of the filamentary element, and insulating means insulating the first terminal member from the supporting member, an electroconductive second filamentary element spaced along said axis from the first filamentary element and having a length extending along said axis, third securing means securing a first end of the second filamentary element to the stator unit, and fourth securing means securing a second end of the second filamentary element to the second end of the supporting member, each of the filamentary elements being twistable to permit relative rotation of the ends of each of the filamentary elements about the axis, said fourth securing means including an electroconductive second terminal member electrically connected to the second end of the second filamentary element, said mounting means including tensioning means biasing the first ends of the filamentary elements away from each other, whereby the filamentary elements position the supporting member axially and radially relative to the axis while permitting rotation of the supporting member about the axis relative to the stator unit, an electroconductive coil having two leads connected respectively to the terminal members, said coil having a first coil side parallel to and radially spaced from the axis, said coil having a second coil side adjacent said axis and secured to the supporting member, said supporting member comprising an integral aluminum member having a central portion extending parallel to the axis and having end portions extending transversely of said axis to form platforms, said second and fourth securing means each including a hollow tower element concentric with said axis for securing the associated one of the terminal members to the associated one of the platforms, and a magnetic structure having an airgap arcuate about said axis for receiving and establishing a magnetic field for the first coil side.

25. In a moving-coil measuring instrument, a stator unit comprising a magnetic structure having an airgap arcuate about an axis, and means for establishing a magnetic field in the airgap, said magnetic structure having an opening adjacent said axis, a rotor unit comprising an electroconductive coil having a first coil side disposed in the airgap and a second coil side disposed in said opening, means mounting the rotor unit for rotation relative to the stator unit about said axis, and a continuous electroconductive damping loop having a first side disposed in said airgap and a second side disposed adjacent said opening, said loop and coil being located one within the other, said loop sides and axis being intersected by a common plane containing the axis, said damping loop being permanently secured to the coil and having a portion in said opening spaced from the coil and accessible for severance to interrupt said loop.

26. In a measuring instrument, a stator unit, a rotor unit, and mounting means mounting the rotor unit for rotation about an axis relative to the stator unit, said mounting means comprising a filamentary element having a length extending along said axis, first securing means securing a first end of the element to the stator unit and second securing means securing a second end of the element to the rotor unit, said filamentary element being constructed of a resilient material which is strain-free to eliminate substantially zero set.

27. In a measuring instrument, a stator unit, a rotor unit, and mounting means mounting the rotor unit for rotation about an axis relative to the stator unit, said mounting means comprising a first twistable filamentary element having a length extending along said axis, first securing means securing a first end of the element to the stator unit, second securing means securing a second end of the element to the rotor unit, a second twistable filamentary element spaced along said axis from the first filamentary element and having a length extending along said axis, third securing means securing a first end of the second filamentary element to the stator unit, and fourth securing means securing a second end of the second filamentary element to the rotor unit, said mounting means including tensioning means maintaining said element lengths under tension along said axis, said filamentary elements being constructed of a resilient alloy containing platinum in a major amount by weight and containing a hardening ingredient in an amount by weight substantially less than said major amount, said alloy being strain-free to eliminate subtantial zero set.

28. In a measuring instrument, a stator unit, a rotor unit, and mounting means mounting the rotor unit for rotation about an axis relative to the stator unit, said mounting means comprising a first twistable filamentary element having a length extending along said axis, first securing means securing a first end of the element to the stator unit, second securing means securing a second end of the element to the rotor unit, a second twistable filamentary element spaced along said axis from the first filamentary element and having a length extending along said axis, third securing means securing a first end of the second filamentary element to the stator unit, and fourth securing means securing a second end of the second filamentary element to the rotor unit, said mounting means including tensioning means maintaining said element lengths under tension along said axis, said filamentary elements having a rectangular, cross-section and being constructed of an alloy containing at least 85% by weight of platinum and containing a substantial amount of nickel which does not exceed 15% by weight of the alloy, said alloy being strain-free to eliminate substantially zero set.

References Cited in the file of this patent

UNITED STATES PATENTS

| | | |
|---|---|---|
| 792,843 | Northrup | June 20, 1905 |
| 800,873 | Northrup | Oct. 3, 1905 |
| 1,832,307 | Kingsbury | Nov 17, 1931 |
| 2,086,992 | Weber | July 13, 1937 |
| 2,425,408 | Williams | Aug. 12, 1947 |
| 2,426,777 | Lingel | Sept. 2, 1947 |
| 2,429,757 | Hickok | Oct. 28, 1947 |
| 2,537,221 | Hickok | Jan. 9, 1951 |
| 2,562,183 | Greibach | July 31, 1951 |
| 2,573,998 | Thompson | Nov. 6, 1951 |
| 2,608,752 | Schilling | Sept 2, 1952 |
| 2,622,118 | Hendricks | Dec. 16, 1952 |
| 2,633,480 | Staff | Mar. 31, 1953 |
| 2,657,358 | Richardson | Oct. 27, 1953 |
| 2,708,737 | Skidmore | May 17, 1955 |
| 2,716,680 | Muzzey | Aug. 30, 1955 |
| 2,820,948 | Kelly | Jan. 21, 1958 |
| 2,837,717 | Berry | June 3, 1958 |
| 2,844,793 | Travis | July 22, 1958 |
| 2,852,744 | Morrow | Sept. 16, 1958 |
| 2,917,709 | Montgomery | Dec. 15, 1959 |

FOREIGN PATENTS

| | | |
|---|---|---|
| 1,114,189 | France | Apr. 9, 1956 |
| 433,080 | Great Britain | Aug. 8, 1935 |
| 561,850 | Great Britain | July 7, 1944 |
| 752,471 | Great Britain | July 11, 1956 |
| 232,655 | Switzerland | Sept. 1, 1944 |

OTHER REFERENCES

"Rare Metals Handbook," by C. A. Hampel, Reinhold Publishing Corp., June 30, 1954, pages 307, 308, 313, 322 and 323.